Dec. 10, 1940.  J. S. PECKER  2,224,357
REMOTE CONTROL STEERING APPARATUS FOR FLYING MACHINES
Filed Aug. 4, 1938  5 Sheets-Sheet 1

JOSEPH S. PECKER
*INVENTOR.*

BY *Louis Necho*
ATTORNEYS.

JOSEPH S. PECKER
INVENTOR.

Dec. 10, 1940.   J. S. PECKER   2,224,357
REMOTE CONTROL STEERING APPARATUS FOR FLYING MACHINES
Filed Aug. 4, 1938   5 Sheets-Sheet 3

JOSEPH S. PECKER
INVENTOR.

BY Louis Nechs
ATTORNEYS.

Dec. 10, 1940.    J. S. PECKER    2,224,357
REMOTE CONTROL STEERING APPARATUS FOR FLYING MACHINES
Filed Aug. 4, 1938    5 Sheets-Sheet 4

INVENTOR.
JOSEPH S. PECKER
BY Louis Necho
ATTORNEYS.

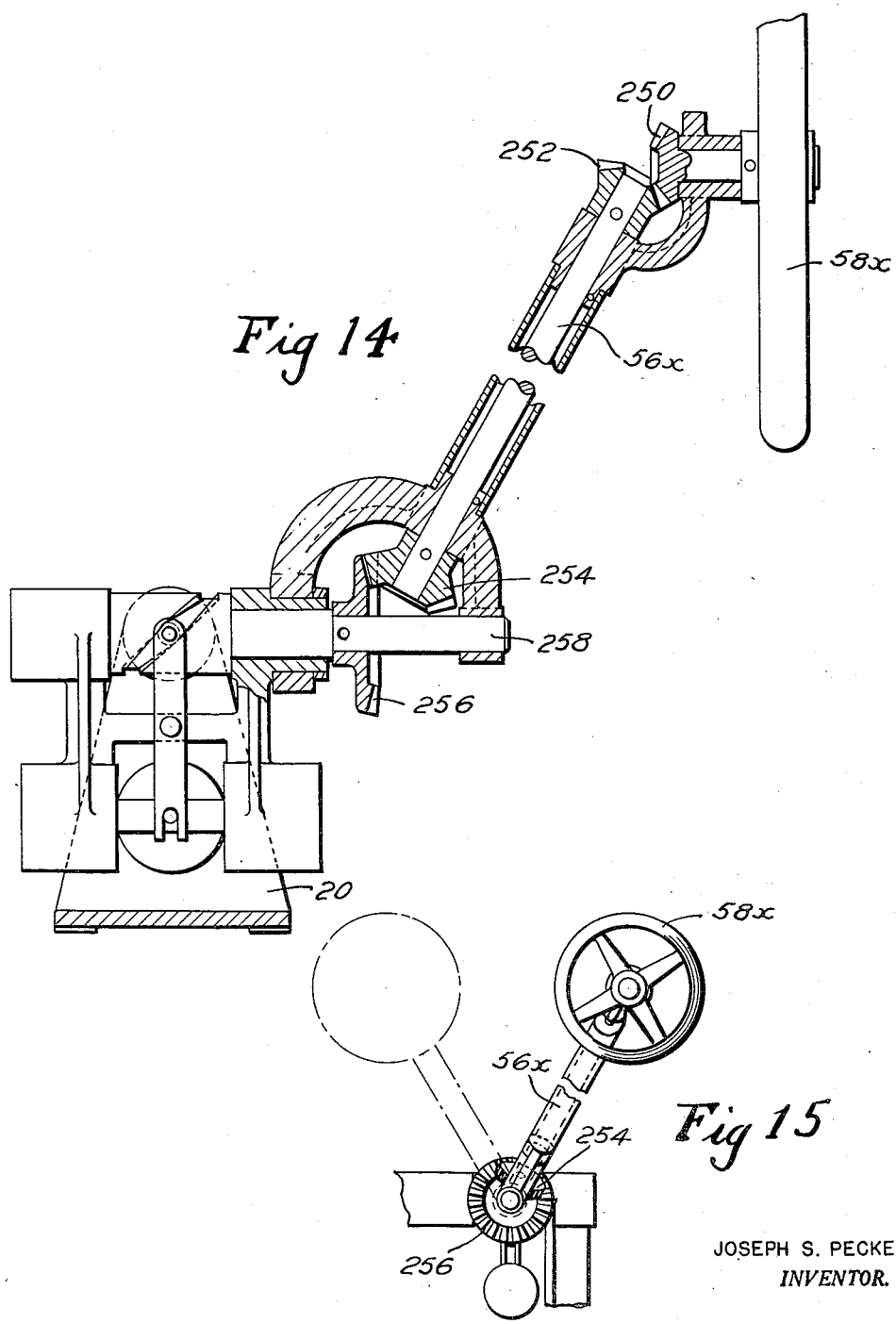

Patented Dec. 10, 1940

2,224,357

UNITED STATES PATENT OFFICE 2,224,357

REMOTE CONTROL STEERING APPARATUS FOR FLYING MACHINES

Joseph S. Pecker, Philadelphia, Pa.

Application August 4, 1938, Serial No. 222,999

9 Claims. (Cl. 244—18)

My invention relates to a new and useful remote control steering apparatus for flying machines and more particularly for flying machines which are provided with a sustaining rotor such as the autogiro, the helicopter, or the like.

My invention further relates to a steering apparatus whereby the person flying a machine can, from the conventional cockpit and by remote control, tilt or bank the entire sustaining rotor of a flying machine laterally, such as to the left and the right to bank the flying machine for turning left or right, or vertically to lower or raise the front or rear of the machine for climbing or descent as the case may be, all of said operations being effected by means of one operating shaft or lever or "joy stick."

My invention still further relates to a remote control steering apparatus of the type set forth, which is actuated hydraulically thereby reducing to a minimum the effort necessary to be expended in operation which is very important when the torque or resistance of the rotor in movement is considered, and which, unlike mechanical means for so tilting the rotor, acts as a dash pot to absorb or cushion the jar or recoil, this being effected by the provision of the hydraulically operated apparatus in which the cylinders and conduits containing the fluid all interconnect thus forming a complete circuit so that the operation of the remote control apparatus merely consists in displacing the fluid from one point to another in a continuous circuit.

My invention further relates to a remote control steering apparatus in which the sustaining rotor of the flying machine can be tilted, not only in any desired direction, but also in any desired combination of directions such as, banked to the right and tilted downwardly at the front to turn the machine to the right, and at the same time to enable it to rise, and vice versa.

My invenion still further relates to a remote control steering apparatus of the character stated which can be shifted in its entirety to enable either one of two persons sitting side by side in the cockpit of a flying machine to operate the same without the necessity of changing places and without the necessity of duplicating the apparatus.

My invention further relates to a remote control steering apparatus, whereby, any excessive vibration or torque resulting from damage of the rotor is prevented from reaching the operating shaft or lever, or joy stick, in the hand of the operator, which would be the case where ordinary mechanical expedients are used to interconnect the joy stick to the rotor steering apparatus.

The construction and operation of my novel remote control steering apparatus will be more clearly understood from the following specification and the accompanying drawings in which:

Fig. 14 is similar to Fig. 4 showing a modified form of construction.

Fig. 15 is a fragmentary perspective view on a reduced scale showing the hand wheel and steering column in two different positions.

Figure 1:
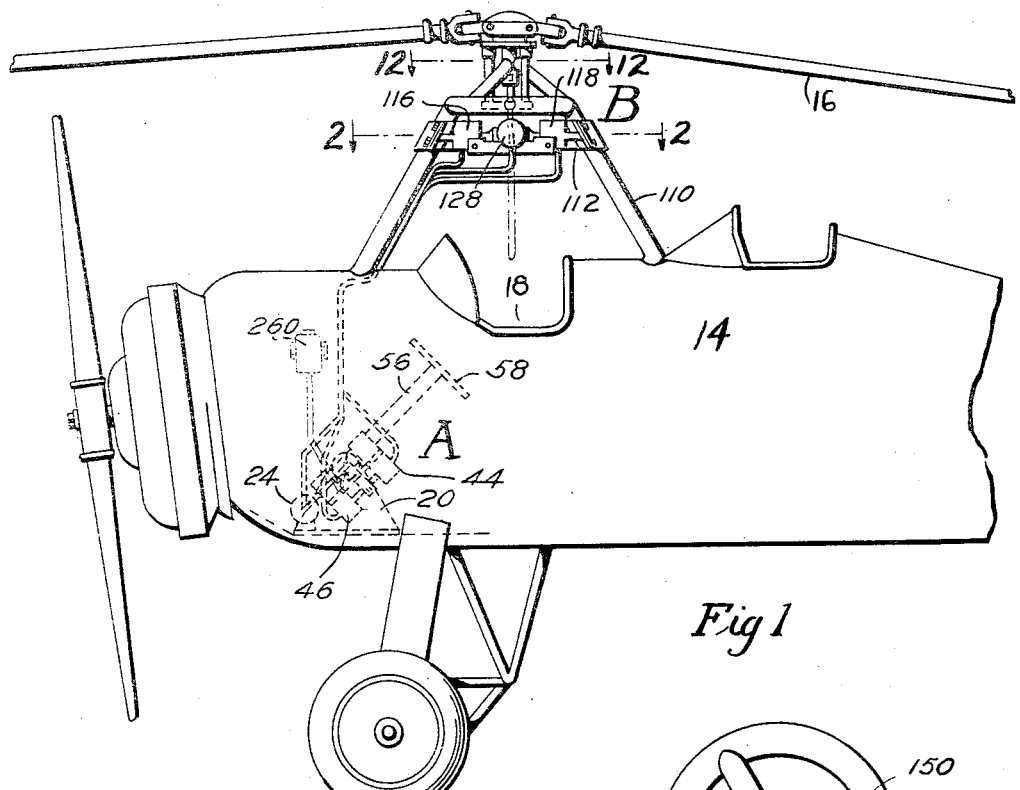
Fig. 1 represents a fragmentary and diagrammatic view in side elevation of a flying machine steering apparatus embodying my invention.
Figure 12:
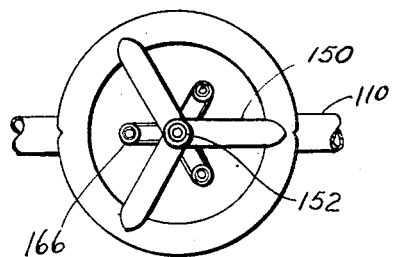
Fig. 12 represents on an enlarged scale a section on line 12—12 of Fig. 1.

Referring to the drawings in which like reference characters indicate like parts and more particularly to Fig. 1, 14 designates the fuselage of a flying machine of the type provided with a sustaining rotor 16 and having the cockpit 18 for accommodating the operator of the ship. My invention, generally speaking, embodies two parts, one embodied in the fuselage 14 and accessible to the operator and now designated generally as A, and the other part positioned above the fuselage 14 and by means of which the control is transmitted to the rotor 16 and it is now generally designated as B.

Figure 5:
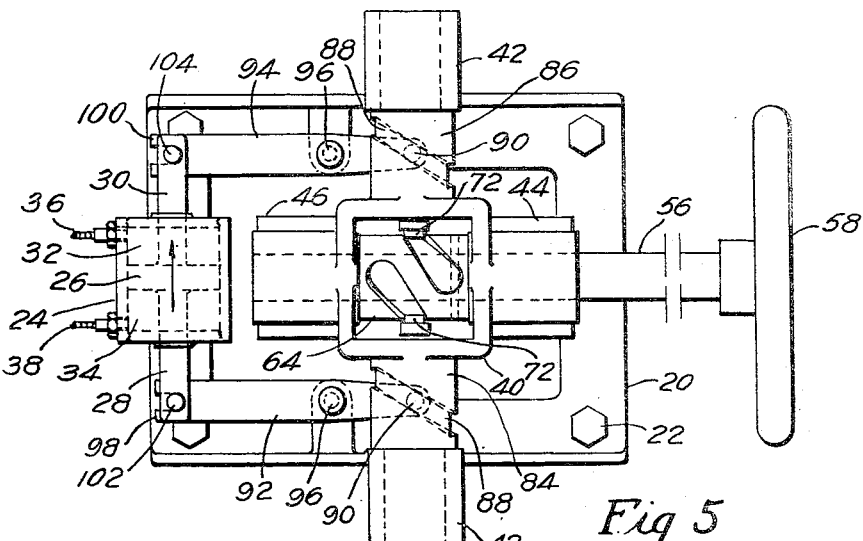
Fig. 5 represents a plan view of Fig. 4.
Figure 6:
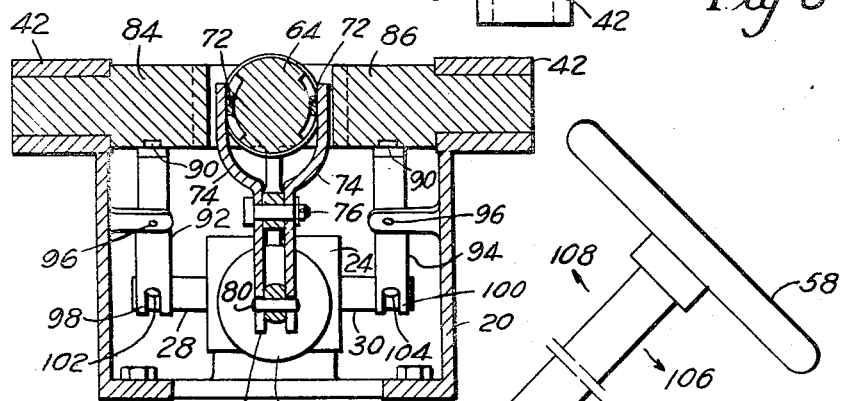
Fig. 6 represents a section on line 6—6 of Fig. 4.
Figure 4:
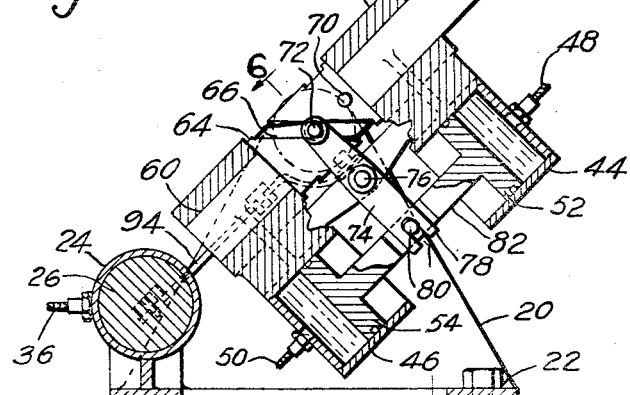
Fig. 4 represents, partly in section and partly in elevation, and on an enlarged scale, the operating mechanism shown in dotted lines in Fig. 1.

The actuating or manipulating assembly A is best illustrated in Figs. 4, 5 and 6 and it consists generally of the bracket or housing 20 suitably secured to the floor of the flying machine as at 22. The bracket 20 supports the cylinder 24 in which is disposed a double-acting piston 26 provided with the oppositely disposed actuating arms 28 and 30 by means of which the piston 26 can be moved in either direction within the cylinder 24. The piston 26 divides the cylinder 24 into two compartments 32 and 34 which are filled with a suitable fluid and which are provided with the outlets 36 and 38 respectively. 40 designates a block pivoted in the bearings 42 so as to be tiltable about its horizontal axis. Block 40 includes cylinders 44 and 46 which are provided with the outlets 48 and 50 and in which reciprocate the pistons 52 and 54. 56 represents a steering shaft having the operating hand wheel 58 which is journalled at its lower end in the bearings 60. Near the lower end of the shaft 56 is provided a cylindrical member 64 which is provided with cam slots 66. The cylindrical member 64 is suitably secured to the shaft 56 as at 70. In the cam slots 66 are engaged the pins 72 on the forked ends of the link 74 which is pivoted at 76 and provided with the outer slotted end 78. Pin 80 engages the slots of end 78 and in turn is carried by connecting rod 82 which is common to the pistons 52 and 54. When the hand wheel 58 is turned to the right or to the left, the cam slots 66 actuate the pins 72 to move the link 74 and thus move the pistons 52 and 54 within their respective cylinders 44 and 46. 84 and 86 designate extension members similar to the member 64, which are also provided with cam slots 88 which are adapted to engage pins 90 at the ends of the links 92 and 94 which are pivoted at 96. The links 92 and 94 are provided with slotted ends 98 and 100 which engage the pins 102 and 104, respectively, on the stems 28 and 30 of the common piston 26. By this means, when the shaft 56 is tilted in the direction of the arrows 106 or 108, the stems 28 and 30 are actuated accordingly to move the piston 26 within the cylinder 24. The movement of the various pistons and the various cylinders thus described naturally results in expelling the oil from the various cylinders to the extent of the movement and in the corresponding direction.

Figure 2:
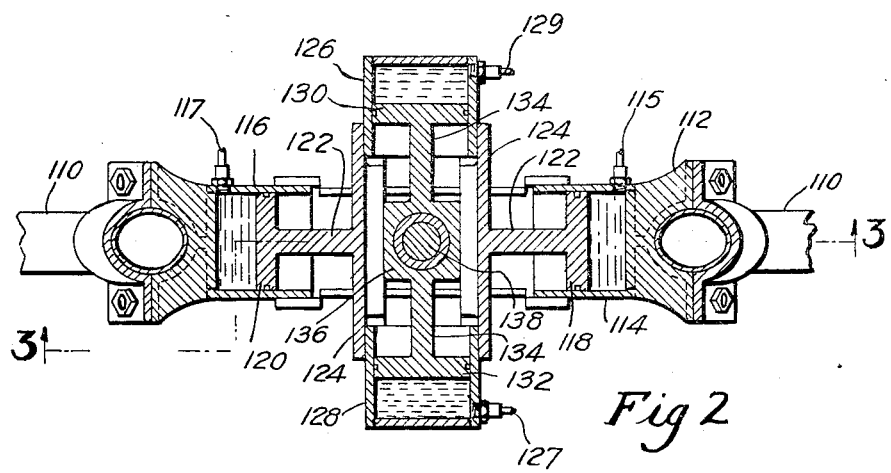
Fig. 2 represents on an enlarged scale a section on line 2—2 of Fig. 1.
Figure 3:
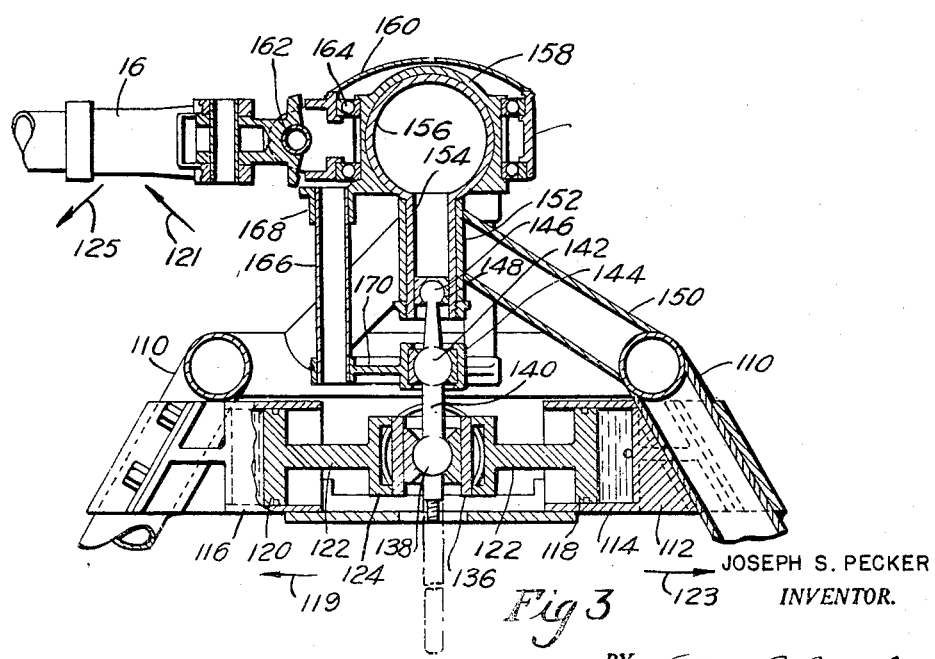
Fig. 3 represents a section on line 3—3 of Fig. 2.

Referring now to the part B of the operating mechanism, which is best seen in Figs. 2 and 3 I provide the braces 110 which are suitably secured to and extend upwardly from the fuselage 14 to support the housing 112 in which are the cylinders 114 and 116. These cylinders are connected through suitable piping 115 and 117 to the chambers 32 and 34 on the opposite sides of the piston 26 in the common cylinder 24. Within the cylinders 114 and 116 reciprocate the pistons 118 and 120 the connecting rods 122 of which terminate or meet in a crosshead or housing 124. The housing 124 carries the cylinders 126 and 128 which, through suitable piping 127 and 129, are connected to the cylinders 44 and 46. Within the cylinders 126 and 128 reciprocate the pistons 130 and 132, the connecting rods 134 of which terminate in a bearing block 136 in which a vertically slidable socket is mounted for accommodating the ball 138 at the lower end of the link 140. This link is pivotally joined to housing 144 by means of a ball and socket 142, and fulcrumed at its upper ball end 146 in the bearing 148. The braces 110 are extended upwardly at 150 and are fixed to the sleeve 152, in which is mounted the spindle 154. The upper end of spindle 154 terminates in the ball 156 upon which the socket 158 is seated to effect a universal joint. The socket 158 is centered in the hub 160 which supports the rotor 16 through hinges 162, and which is free to rotate with respect to the socket on the bearings 164. 166 designates connecting arms which are suitably secured at 168 to the socket 158 and which, at their bottom ends, are connected by the arm 170 to the housing 144.

Figure 7:
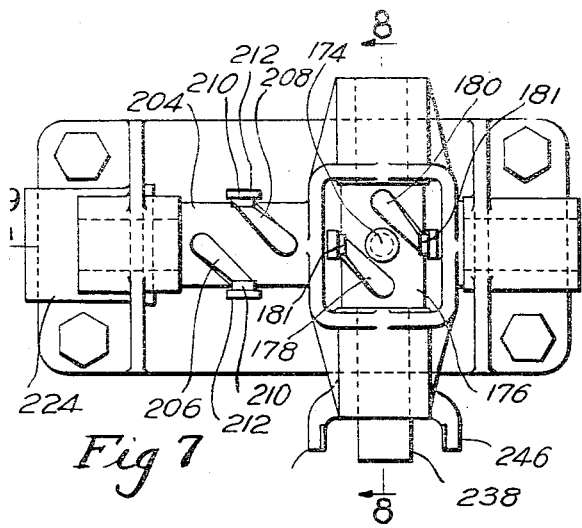
Fig. 7 represents a view similar to Fig. 5 showing a modified form of construction.
Figure 8:
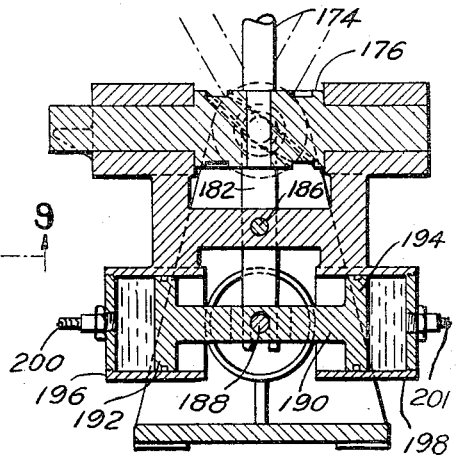
Fig. 8 represents a section on line 8—8 of Fig. 7.
Figure 9:
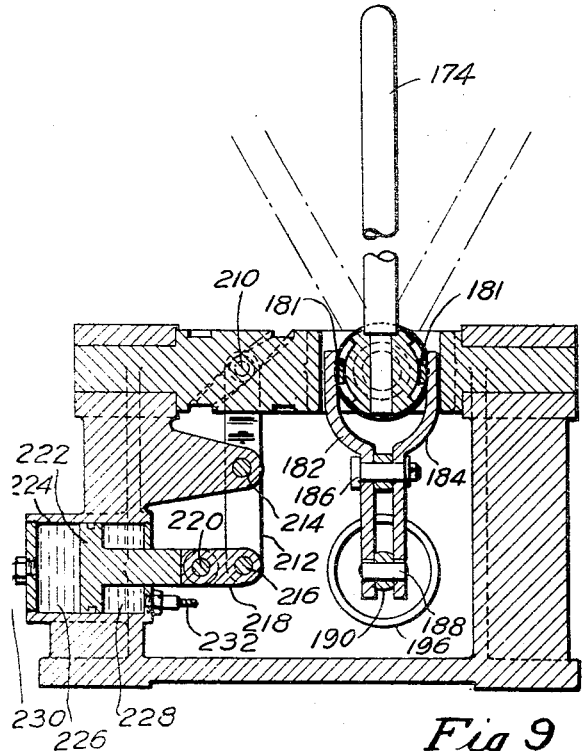
Fig. 9 represents a section on line 9—9 of Fig. 7.

In Figs. 7 to 9 I have shown a modified form of construction in which, instead of the steering shaft 56 with the hand wheel 58 I utilize the joy stick 174 which is suitably secured to the cylindrical member 176. Cam slots 178 and 180 connecting rod engage the pins 181 on the arms 182 and 184 which are tied together at their pivot point 186 and the ends of which form a fork to receive the pin 188 carried by the piston stem 190 which carries the pistons 192 and 194 reciprocating in the cylinders 196 and 198. The cylinders 196 and 198 are provided with outlets 200 and 201 which lead through piping (not shown) to the cylinders 126 and 128, whereby the rotor 16 is tilted or banked to the right or to the left in turning. To effect forward and backward tilting of the rotor to raise or lower the machine I provide the extension sleeve or tubular member 204 which is also provided with the left and right, or oppositely disposed, cam slots 206 and 208 which are adapted to engage pins 210 on the arms 212 fulcrumed at 214 and the ends of which are pivotally connected at 216 to the link 218. This link is pivoted at 220 to the piston 222 operating in the double-action cylinder 224, divided by the piston 222 into two compartments 226 and 228 provided with outlets 230 and 232 respectively, which lead through piping (not shown) to the cylinders 114 and 116.

Figure 10:
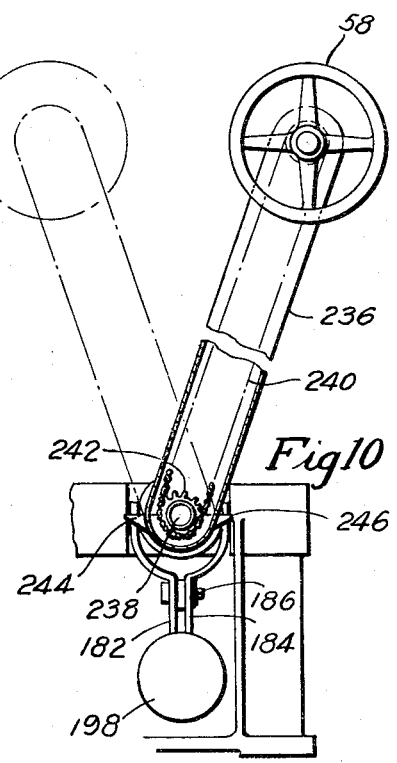
Fig. 10 represents, partly in section and partly in elevation, a further modification of the operating stick.
Figure 11:
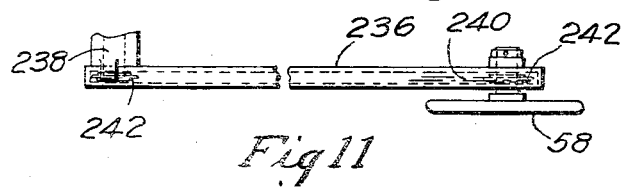
Fig. 11 represents a plan view of Fig. 10, certain parts being omitted.

In order to provide for dual control in double-seater ships I have devised the construction illustrated in Figs. 10 and 11 in which I mount the housing 236 on the extension shaft 238 and I provide a sprocket chain 240 riding on the sprocket wheel 242 and operable by the hand wheel 58. 244 and 246 designate stops for limiting the tilting motion of the housing 236 in the direction shown in solid and dotted lines in Fig. 10 so that, if one of the two co-pilots wants to fly the machine, the housing 236 on the extension shaft 238 is swung to the position shown in dotted lines in Fig. 10, whereby the actuating mechanism can be operated from that position in the manner hereinabove described, and if the other pilot wants to fly the ship the housing 236 is swung into the position shown in solid lines in Fig. 10 from which it is accessible for operation by said second pilot.

Figure 13:
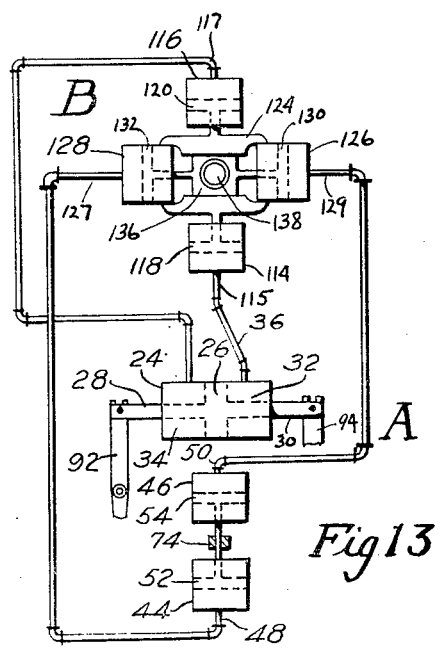
Fig. 13 represents diagrammatically the arrangement and the relation of the various cylinders forming part of my invention.

The operation is as follows:

As shown in Fig. 13, the hydraulic pistons forming the system A are connected to the hydraulic system B by a conduit between outlets 36 and 115, thus joining compartment 32 of piston 26 to compartment 114 of piston 118; a conduit between outlets 38 and 117, for providing communication between compartment 34 of piston 26 and compartment 116 of piston 120; a conduit joining outlets 50 and 129 for hydraulically connecting pistons 54 and 130; and a conduit joining outlets 48 and 127, and providing communication between pistons 52 and 132.

To elevate the forward side of the plane in which the rotors 16 rotate, and thus to climb the airship, the steering wheel 58 and column 56 are moved downwardly in the direction of the arrow 106, Fig. 4. Shaft 84, 86 is therefore rotated and causes pins 90 to be displaced by cams 88 in a direction toward the bottom side of Fig. 5. Through levers 92 and 94, piston 26 is shifted in the direction of the arrow shown thereon, and forces fluid out of outlet 36 into compartment 114 of piston 118. Entrance of fluid into compartment 114 forces piston 118 to the left in Fig. 3. End 138 of lever arm 40 moves to the left in an arc, end 148 being a fixed pivot point, and vertical adjusting movement taking place by the sliding of the socket holding end 138 in housing 136. Arms 166 and 170 connecting lever 140 to socket 158 are therefore rotated clockwise in Fig. 3 to tilt the plane of rotors 16 in the direction shown by the arrow 121.

To reverse this movement, and dive the airship, the steering column 56, Fig. 4 is moved in the direction of arrow 108. Fluid is then forced by piston 120 to move both pistons 118 and 120 to the right in Fig. 3. Lever 140 then rotates counterclockwise to tilt the plane of rotor rotation in the direction of arrow 125. It is noted that the conduits connecting A and B become alternatively pressure and return lines, depending upon the direction of tilting.

To tilt the rotor plane to the right or left with respect to the line of forward flight in order to bank the rotor for turning purposes, the wheel 58 is rotated. For example, a right turn is executed by a clockwise turning of wheel 58. Cams 66 thus draw pins 72, Figs. 4 and 5, toward the wheel and rock lever 74 to push piston 54 downwardly, Fig. 4, and force fluid outwardly of cylinder 46 through opening 50. Fluid is thus forced into cylinder 126 and moves piston 130 to the left with respect to the direction of flight. As housing 136 is fixed to piston 130 by connecting rod 134, the lever 140 is likewise moved, and the rotor plane is tilted downwardly to the right. To tilt the rotor to the left, pistons 52 and 132 are actuated in a similar manner.

Because pistons 130 and 132 are mounted transversely slidable of connecting rod 122, it is apparent that steering column 56 can be moved in the direction of arrows 106 of 108 at the same time steering wheel 58 is rotated, and consequently the lever 140 is correspondingly shifted to tilt the rotor plane for climbing or diving turns of the airship.

The apparatus of Figs. 7 to 9 operates in a similar manner. Movement of stick 174 forward or backward forces fluid from piston 222 to pistons 118 and 120 to tilt the rotor plane for climbing or diving, and movement of stick 174 to the right or left actuates pistons 192 and 194 to effect through pistons 130 and 132 right or left tilting of the rotor plane. Also, stick 174 can be moved diagonally to cause climbing and diving turns.

It will be noted that the engagement of the pins 90 in the slots 88, as well as the pins 72 in the slots 66 act as an automatic self-locking device against retrograde movement of the steering element 56 either as to its forward and backward movement or as to its rotation or the reason that the slots 66 and 88 act the same as a worm and are not in the nature of worm slots. This makes it possible for the steering element to be actuated by the operator. When the resistance and thrust or torque of the rotor against the air under varying conditions is remembered the importance of this construction becomes apparent. Furthermore, it is known that with other conventional forms of steering of the rotor, fatal accidents have happened, when, due to exceptionally high winds or due to damage to the rotor, the stick by which the operator was steering the rotor went out of control and hit the operator. My self-locking arrangement thus not only protects the operator against injury but prevents the excessive vibration which is incident to the normal operation, from reaching the pilot, and also prevents any violent jerking of the steering element in the hands of the pilot due to air pockets, or any damage to the rotor itself.

From Fig. 4 it will be seen that the pistons 52 and 54 which are carried by the housing 40 are not affected at all by the tilting of the housing 40 and steering element 56 to actuate the piston 26 in the cylinder 24 and that, conversely, the rotation of the steering element 56 actuates the pistons 52 and 54 to the exclusion of the piston 26 in the cylinder 24. From Fig. 2 it will be seen that the complementary hydraulic mechanism, which is associated with and actuates the rotor, is so constructed that the cylinders 114 and 116 and their pistons 118 and 120 are constructed as a unit with respect to each other and with respect to the intermediate cylinders 126 and 128 so that, as the pistons 118 and 120 are moved in either direction, the cylinders 126 and 128 and their adjuncts are moved accordingly but are not actuated, and, conversely, that the actuation of the pistons 130 and 132 is entirely independent of and does not affect the action of the pistons 118 and 120. By this construction I am able to use a single link 140 for actuating the rotor in any direction in lieu of complicated arms, levers, knuckles, chains, sprockets, etc., which are now conventionally used for varying the position of the rotor. Also it will be seen that by positioning the cylinders 114, 116, 126 and 128 upon intersecting axes in the same plane, the construction is not only greatly simplified from the standpoint of manufacturing costs, but also the structure is rendered more compact and light and with less air resistance, all of which are vital factors in the construction of heavier than air machines. It will also be noted that the swiveling of the rotor about the ball and socket construction which is substantially at the intersection of the plane of rotation with the vertical axis not only strengthens the construction and renders it more compact, but also greatly reduces if not entirely eliminates the tendency towards eccentric gyration, as well as undesirable vibration.

The feature of my invention illustrated in Fig. 10 is also important in that the co-pilot sitting alongside the pilot on duty can at once secure control without the necessity for a duplicate steering mechanism or dual controls and without the necessity of changing positions with the pilot which is essential in emergencies such as sudden disabling of the pilot on duty, due to fatigue, accident, or other causes.

In Figs. 14 and 15 I have shown a further modification of the steering mechanism construction proper in which, instead of mounting the steering column 56x on the housing 40 which is bodily tiltable as shown in Fig. 4 I utilize the hand wheel 58x which meshes through the pinion 250 with the bevelled gear 252 on the steering column 56x which is provided with the pinion 254 meshing with the gear 256 on the shaft 258. In this construction the bracket 20 supports the cylindrical assembly in a normally horizontal position to be actuated by the tilting of the steering column 56 or by its rotation. Fig. 15 is similar to Fig. 10 showing how the steering column and operating hand wheel can be moved from in front of the main pilot towards the adjacent seat of the co-pilot to permit manipulation of the steering apparatus by either the pilot or the co-pilot without the necessity of changing seats.

In order to be able to tilt the rotor manually in an emergency which may develop in the event of the breakdown of the hydraulic operating mechanism, I have extended the fulcrumed link 140 downwardly as shown in dotted lines in Figs. 1 and 3 to render its lower end accessible for manual operation by the pilot in the seat 18. Also, I have added a fluid reserve tank 260 which is suitably connected to the hydraulic system in order to replenish the supply of fluid in any given cylinder or set of cylinders in the event of a slight loss of fluid due to imperceptible leakage over a period of time.

While I have not shown it in the drawings, it is obvious that the various cylinders can be provided with bleeder valves to release the air in the event that any cylinder or cylinders become airbound.

Having thus described my invention, what I claim as new and desire to secure by Letters Patent is:

1. A remote control steering mechanism for an aircraft having a fuselage, a lift sustaining rotor, and a pylon structure intermediate said rotor and said fuselage comprising a universal swivel carried by said pylon structure and upon which said rotor is tiltably mounted, an operating lever fulcrumed to said pylon structure and connected to said swivel, means for actuating said lever in any desired direction including a hydraulic mechanism adapted to move said lever forwardly, backwardly and transversely to tilt said rotor to direct the travel of said aircraft, a forwardly and backwardly tiltable steering element in said fuselage, hydraulic means operatively connecting said steering element to said hydraulic mechanism for transferring the forward and backward movement thereto, said steering element being also mounted for clockwise and counterclockwise rotation about its axis, additional hydraulic means operatively connecting said element to said hydraulic mechanism and operable by the rotation of said steering element for actuating said lever in a direction at an angle to and independent of said forward and backward movement.

2. A remote control steering mechanism for an aircraft having a fuselage and a lift sustaining rotor therefor, comprising a housing mounted in said fuselage for forward and backward tilting movement about a horizontal axis, a steering column tiltable with said housing and also rotatable about its steering column axis, a hydraulic element adjacent said housing and operable by the tilting thereof to tilt said rotor in the forward direction of travel of said aircraft, a second hydraulic element carried by said housing and operative only by rotation of said steering element for tilting said rotor at an angle to the forward direction of travel of said aircraft, and means for operatively connecting said steering element to said second hydraulic element comprising a cam slotted element disposed along said horizontal axis, and operating links engaged by said slotted element and acting upon said second hydraulic element.

3. A tiltable rotor mounting for the lift sustaining rotor of an aircraft comprising a ball, means mounting said ball upon said aircraft, a socket movably mounted upon said ball, a rotor rotatably mounted upon said socket, a projection extending from said ball, a lever having one end pivotally fixed to said projection, an arm pivotally joined to said lever, at least one link connecting said arm to said socket, a hydraulic motor mounted upon said aircraft, and means joining the other end of said lever to said motor for movement thereby.

4. In an aircraft having a tiltable lift sustaining rotor, a hydraulic motor mounted adjacent said rotor and having a power take-off device movable in any direction in a plane for tilting said rotor, comprising a first pair of oppositely disposed pistons, a first connecting rod joining said pistons, a crosshead mounted transversely of and in substantially the same plane as said first rod, a second connecting rod slidably mounter in said crosshead, a second pair of oppositely disposed pistons joined to said second rod, whereby said second rod and pistons are movable transversely of said first rod, and longitudinally therewith, and means mounting said device for movement with said second rod.

5. In an aircraft having a tiltable lift sustaining rotor, a hydraulic motor mounted adjacent said rotor and having a power take-off device movable in any direction in a plane for tilting said rotor, comprising a crosshead, a first pair of pistons secured to opposite sides, respectively, of said crosshead, a member slidably mounted in said crosshead for movement transversely of said first pistons, a second pair of pistons secured, respectively, to opposite sides of said member, and means joining said device to said member whereby said device is movable longitudinally with said first pistons and transversely thereof.

6. In an aircraft having a lift sustaining rotor mounted for universal tilting movement upon a pylon, hydraulic motor means for tilting said rotor comprising a first cylinder means fixed to said pylon, a first pair of oppositely disposed pistons in said cylinder means, means connecting said first pistons, second cylinder means mounted transversely of said connecting means and movable therewith, a second pair of pistons mounted in said second cylinder means, and power take-off means interconnecting said second pistons with said rotor for tilting the same.

7. A remote control steering mechanism for an aircraft having a fuselage, a lift sustaining rotor, and a pylon structure intermediate said rotor and said fuselage comprising a universal swivel carried by said pylon structure and upon which said rotor is tiltably mounted, lever means for tilting said rotor upon said swivel in any desired direction including a hydraulic mechanism adapted to move said lever means forwardly, backwardly and transversely to tilt said rotor to direct the travel of said aircraft, a forwardly and backwardly tiltable steering element in said fuselage, hydraulic means operatively connecting said steering element to said hydraulic mechanism for transferring the forward and backward movement thereto, said steering element being also mounted for clockwise and counter-clockwise rotation about its axis, and additional hydraulic means operating connecting said element to said hydraulic mechanism and operable by the rotation of said steering element for actuating said lever means in a direction at an angle to and independent of said forward and backward movement.

8. A tiltable rotor mounting for the lift sustaining rotor of an aircraft comprising a ball, means mounting said ball upon said aircraft, a socket movably mounted upon said ball, a rotor rotatably mounted upon said socket, motor means movable in any direction substantially in a plane mounted upon said aircraft adjacent said ball, and lever means interconnecting said motor means and said socket whereby movement of said motor serves to tilt said rotor.

9. In an aircraft having a fuselage, a pylon, and a lift sustaining rotor mounted upon said pylon, a steering mechanism comprising means mounting said rotor for universal turning upon said pylon, a hydraulic motor having pairs of pistons transversely movable of each other supported upon said pylon adjacent said rotor, lever means connecting said motor to said rotor; a steering pump in said fuselage and including pairs of pistons mounted transversely of each other, pressure conduits interconnecting the pistons of said pump and motor, respectively, and maintaining a constant hydraulic pressure therebetween, steering means for operating said pump to tilt said rotor in the desired direction of aircraft travel, and means for maintaining a mechanical efficiency of force transmission in said steering means between said steering means and said pump whereby back pressures produced by movements of said rotor to said motor and pump are less than the manual force appliable to said steering means.

JOSEPH S. PECKER.